June 30, 1953  B. THWAITES  2,643,832
AERODYNAMIC LIFT-PRODUCING DEVICE
Filed Jan. 26, 1949  11 Sheets-Sheet 10

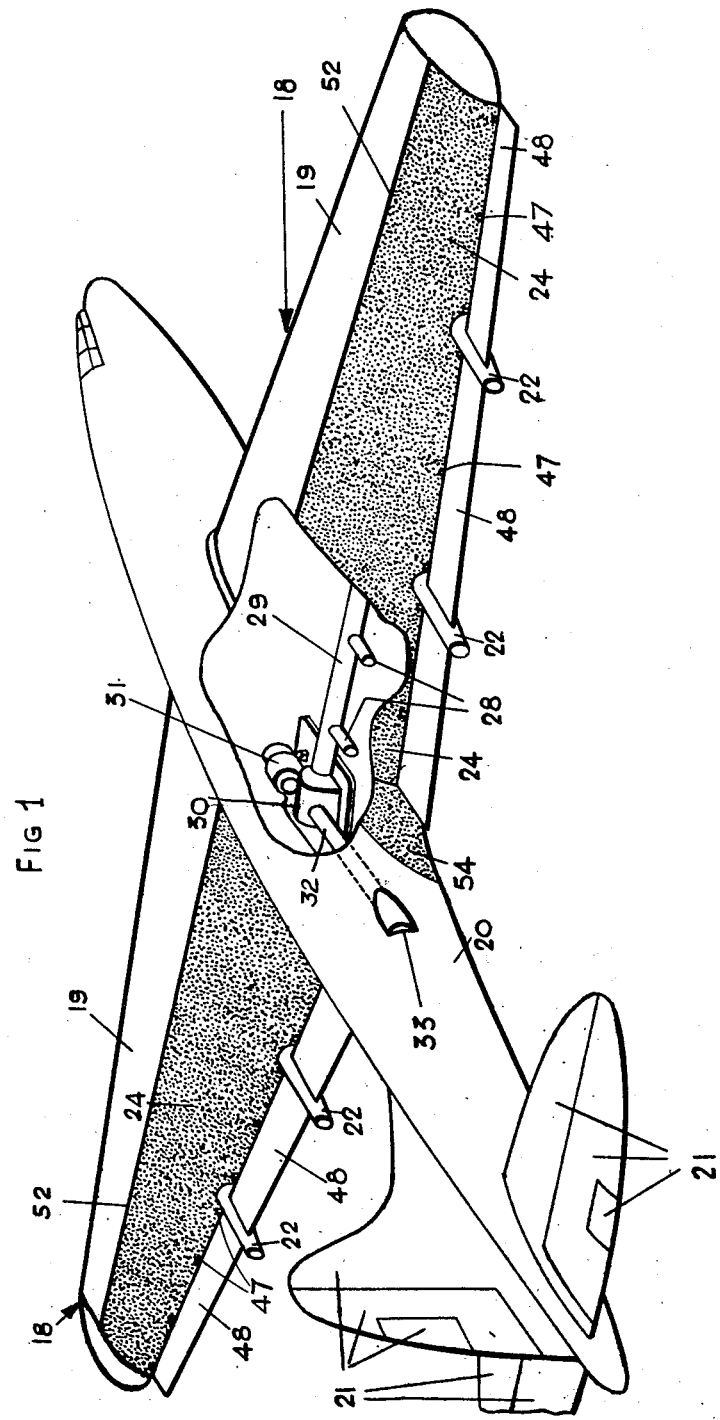

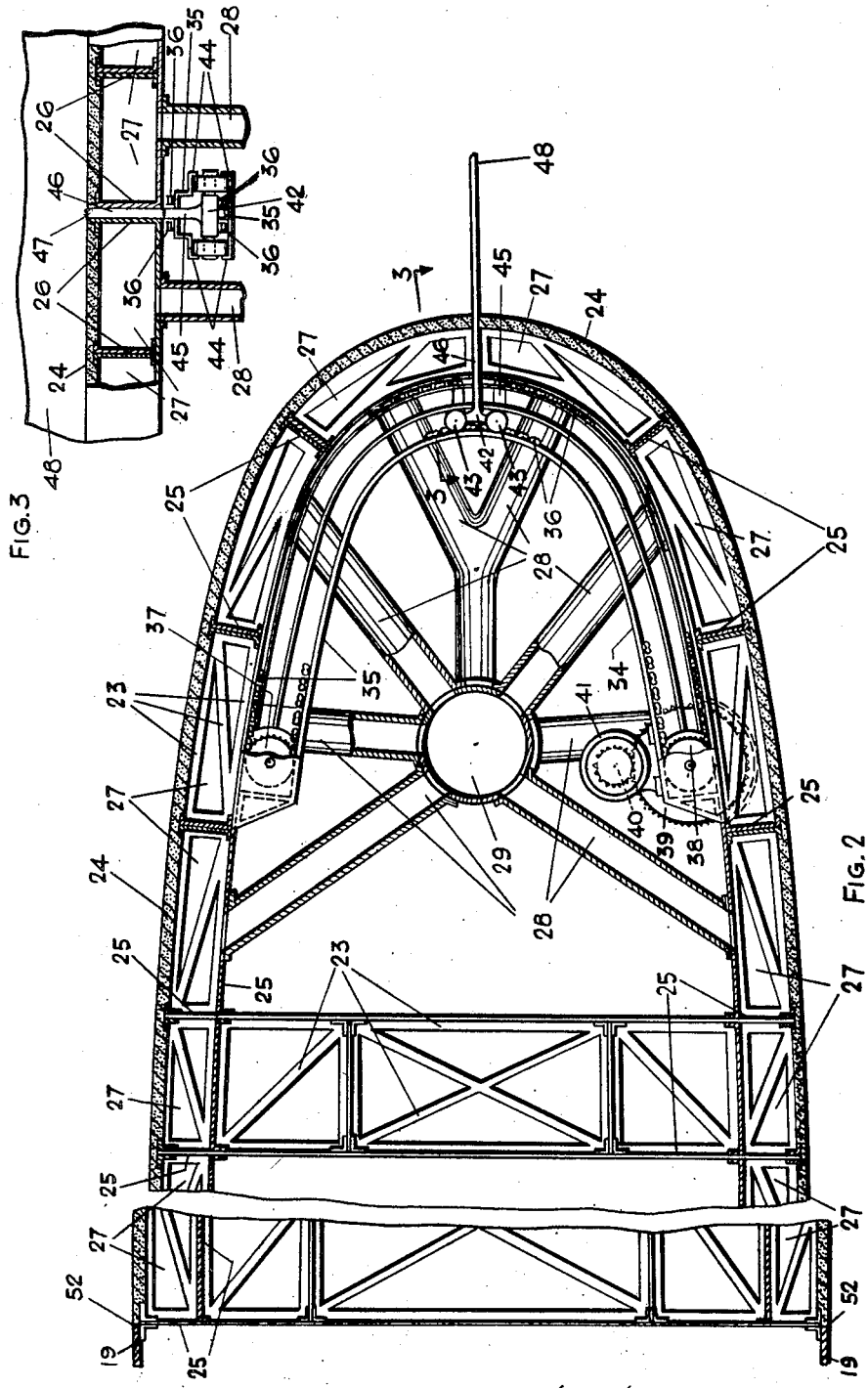

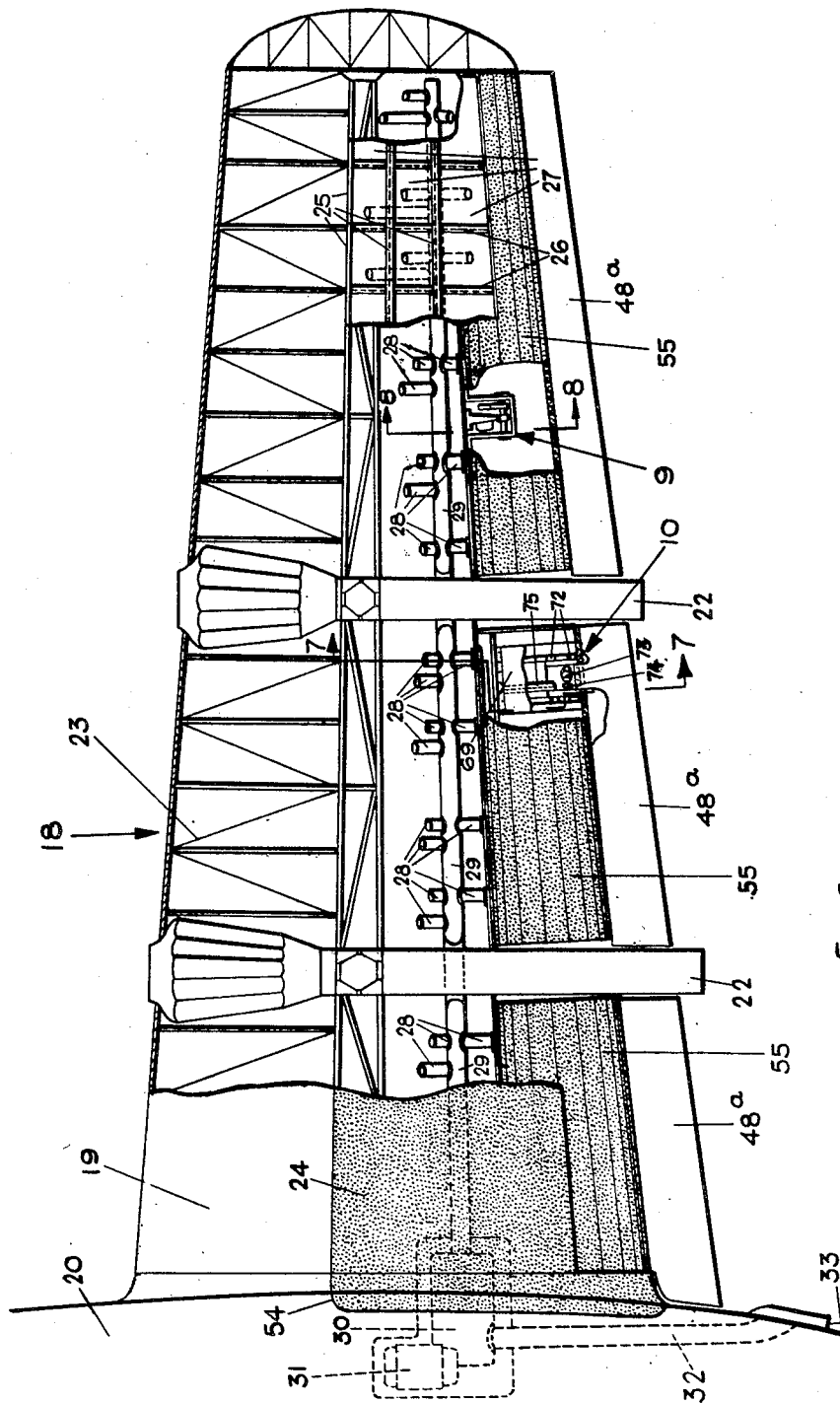

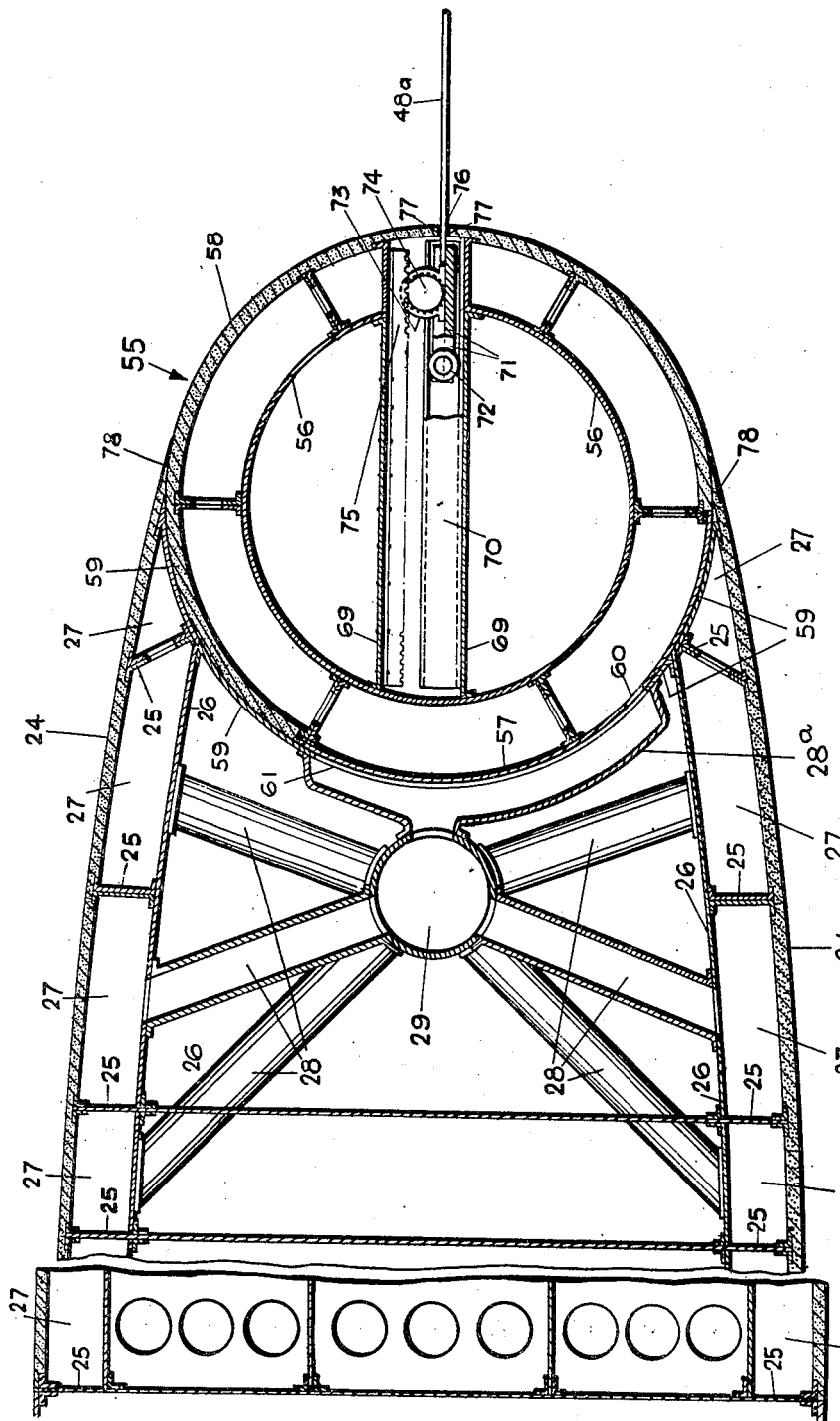

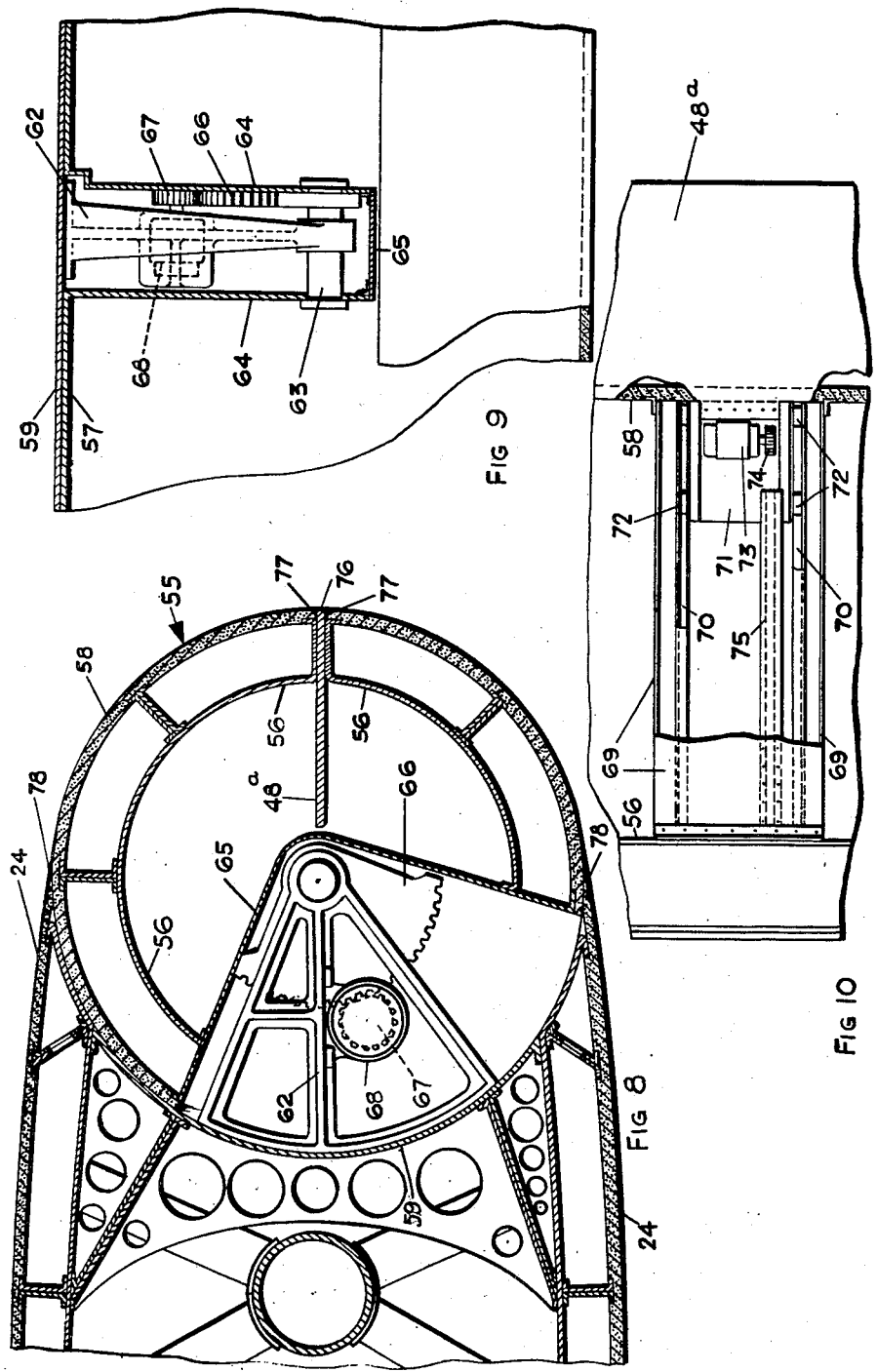

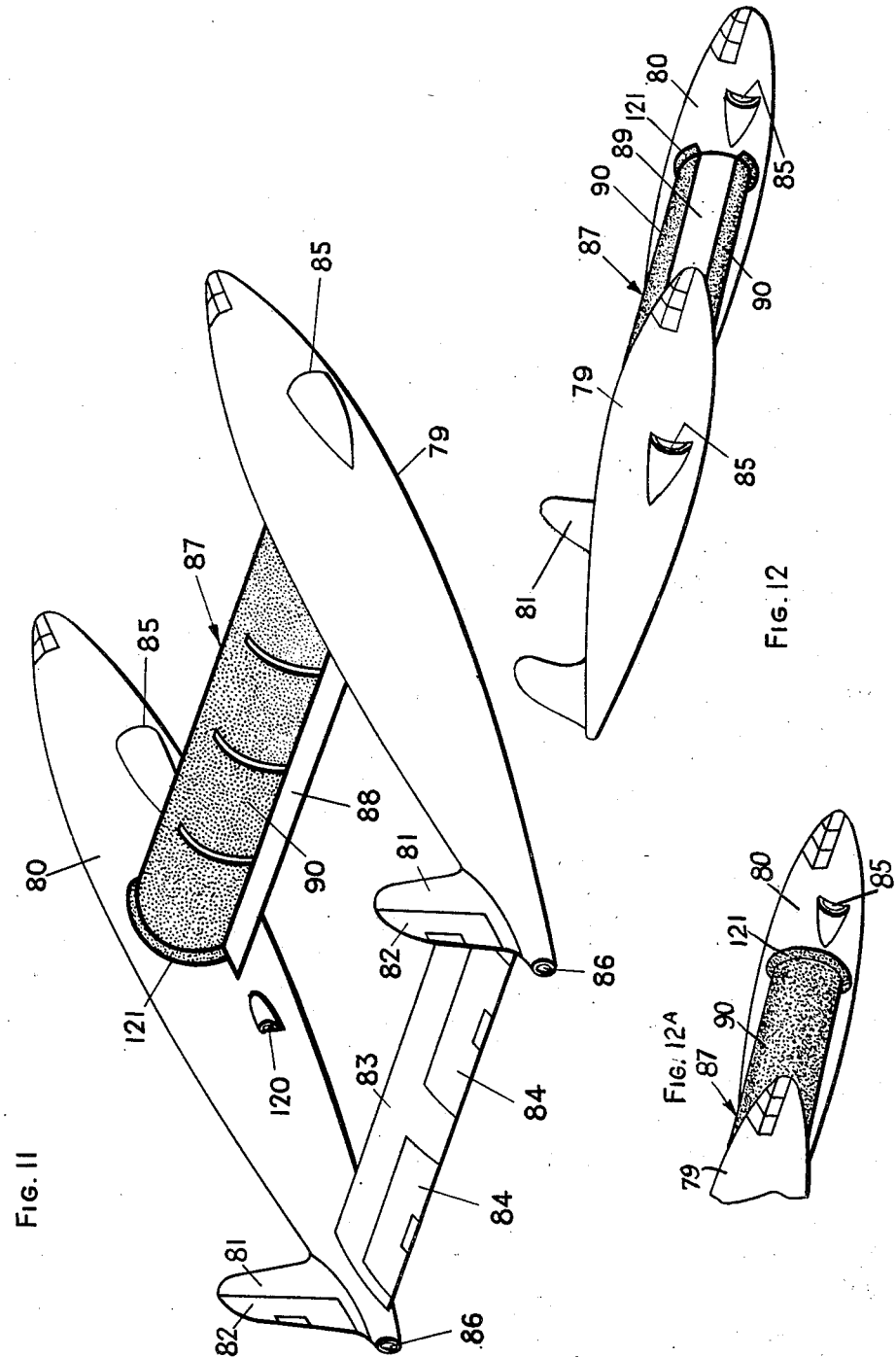

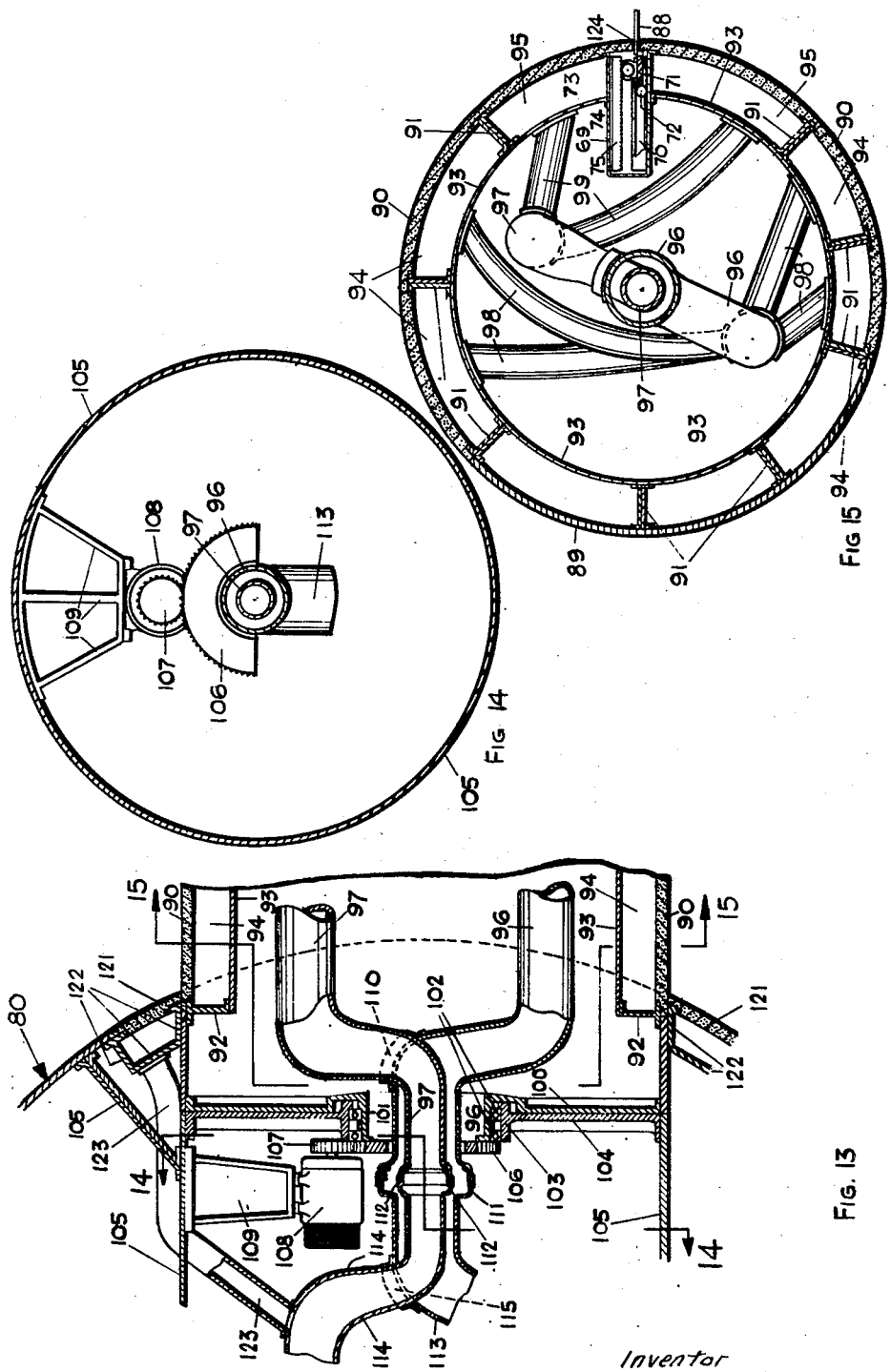

Inventor
Bryan Thwaites
By Watson, Cole, Grindle & Watson
Attorney

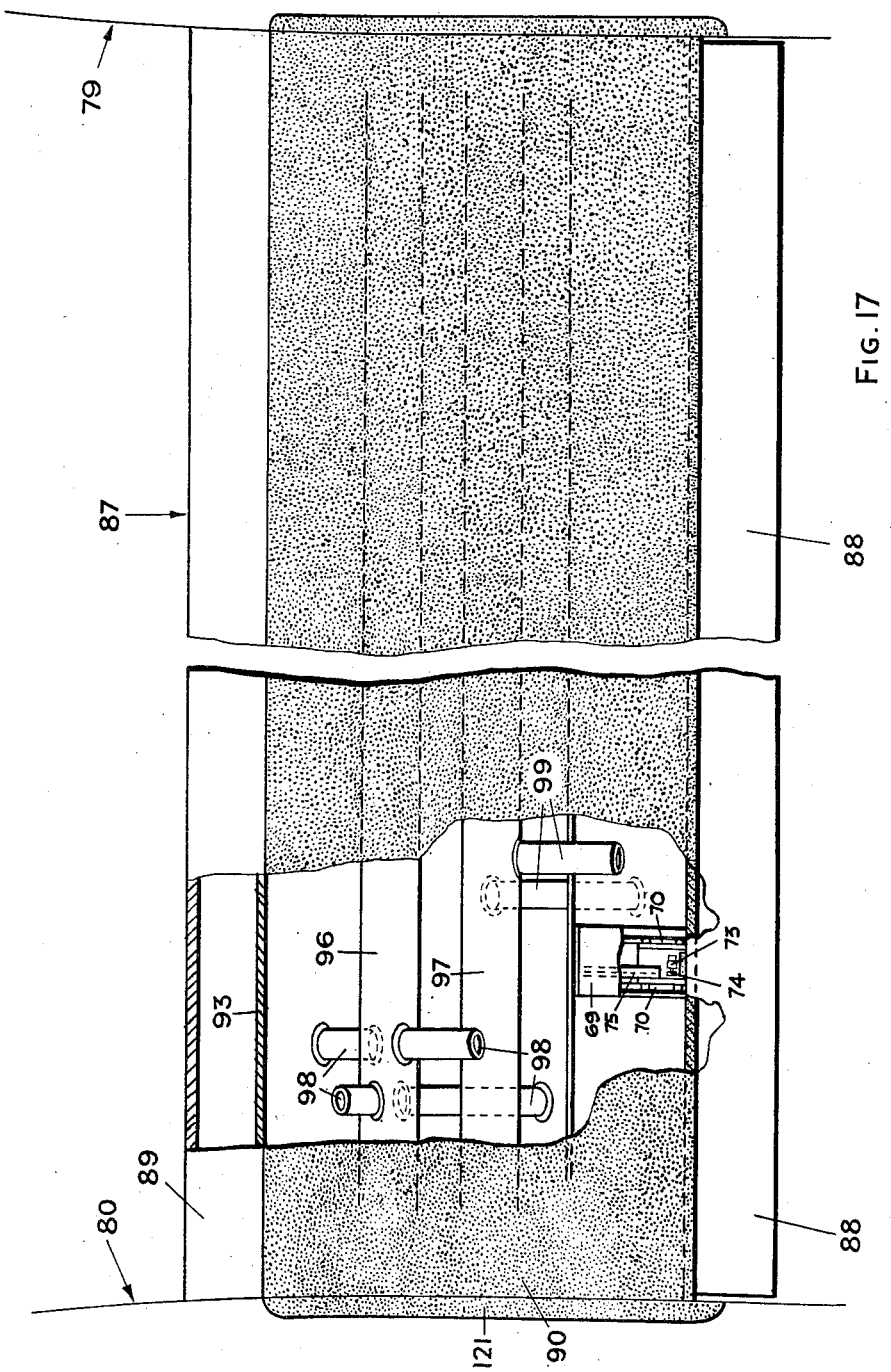

Patented June 30, 1953

2,643,832

UNITED STATES PATENT OFFICE 2,643,832

AERODYNAMIC LIFT-PRODUCING DEVICE

Bryan Thwaites, London, England, assignor to The Imperial Trust for the Encouragement of Scientific and Industrial Research, London, England Application January 26, 1949, Serial No. 72,812

18 Claims. (Cl. 244—40)

This invention relates to aerodynamic lift-producing devices.

Two problems in applied aerodynamics have recently received much attention. The first is the problem of "low-drag," i. e. of considerably reducing the drag of aerofoils over a certain range of lift coefficient. The second is the problem of "increased lift," i. e. of obtaining higher maximum lift coefficients than have hitherto been possible.

The low-drag problem has been met in connection with fairly thin aerofoils by maintaining laminar flow in the boundary-layer over an extensive region of the aerofoil's surface, the pertinent criterion for this being a negative pressure-gradient along the surface in the downstream direction. For thick aerofoils (of thickness/ratios, of, say, 25% or more) the problem of drag-reduction is mainly one of preventing separation of the boundary-layer for which recourse may be had to any one of various methods of boundary-layer control.

The usual method of attacking the increased lift problem is the use of flaps, but the limits to which the maximum $c_L$ can be raised by conventional flap systems have substantially been reached, and the demand is for still higher maximum $c_L$s. Generally speaking, the problem may be approached in two ways; one can seek either to ensure that the lift continues to increase with an angle of attack beyond the angle at which stalling would normally occur, or to increase the lift at a given angle of attack above the classical "Kutta-Joukowski" value. Progress along either of these lines appears to call for some method of boundary-layer control.

The objects of this invention include the solution of both these problems by means of a device comprising an aerofoil having a well-rounded trailing extremity provided with a porous skin, through which continuous distributed suction is applied to the air flowing over it, and a thin narrow-chord flap projecting substantially normally to the rounded trailing edge. The aerofoil section is preferably of the "thick" class, e. g. having a thickness-chord ratio of 30% or more. Such a device can, by an appropriate setting of the flap, be made to produce high-lift without incurring a high-drag penalty, and without setting the aerofoil itself at a high incidence. By merely altering the flap-setting without changing the angle of attack of the aerofoil itself a wide range of lift-coefficients at low drag can be achieved.

With such an arrangement the root of the flap defines the trailing stagnation point, provided the boundary layer adheres to the aerofoil surfaces both and below the flap right up to the flap-root; and this is ensured by the continuous application of distributed suction to the boundary layer through the porous surface.

It is possible in this way greatly to extend the range of $c_L$s for which laminar flow may be maintained and greatly to increase the maximum $c_L$ obtainable, as compared with the values attainable by conventional aerofoils, with or without conventional flaps; and these favourable results can be achieved without the necessity of using high angles of attack with their attendant disadvantages.

The objects of the invention also include a fresh approach to stability and control problems which arise from variation of the pitching moment with lift. From this aspect, a specific object is the provision of an aerofoil device whose aerodynamic centre is fixed and whose pitching moment is zero, or at least constant, for all values of the lift coefficient within the useful working range.

The attainment of this object by my improved aerofoil-flap combination follows from the fact that change of lift is obtainable without change of the angle of attack of the aerofoil, but merely by altering the flap setting. In these circumstances neither the moment coefficient nor the aerodynamic centre varies with the lift coefficient; and by appropriate selection of the aerofoil section and of the angle of attack the moment coefficient may be made zero.

When my improved aerofoil-flap combination is applied to the main wings of aeroplanes, an advantage is afforded in respect to the parasite drag of the body and other parts contributing no useful lift, in that, since change of lift-coefficient can be effected without change of angle of attack of the aerofoil, the attitude of the body and other parasite parts to the flight path can be kept constant over a wide range of flight speeds and the attitude giving minimum parasite drag can be selected and "built-in" to the design.

Further, the use of a wing having a fixed aerodynamic centre and constant moment coefficient greatly simplifies the task of providing adequate stability and control in the pitching plane over a wide range of flight speeds.

An even further increase in the maximum lift-coefficient values attainable can be achieved by a development of the technique of using my improved aerofoil-flap combination which consists in setting the aerofoil at a progressively increasing negative angle of attack as the flap-deflection is increased beyond that at which negative velocity gradients, i. e. velocities decreasing in the downstream direction, appear on the upper surface of the aerofoil with the latter set at zero angle of attack.

These negative velocity gradients first appear near the leading edge and cause separation of the boundary-layer when they become severe. They are associated with a pronounced backward displacement of the forward stagnation point along the lower surface of the aerofoil. Negative angle of attack-setting of the aerofoil displaces the stagnation point in the opposite direction and flattens out the negative velocity gradients, so that by appropriate combination of negative angle of attack and increased downward flap-setting it is possible to achieve greater circulation and higher lift coefficient without boundary-layer separation than would otherwise be obtainable.

In the case of an aeroplane wing fixed to the body the setting of the wing at a negative angle of attack will entail a change of attitude of the body and other parasitic parts and consequently some increase of parasite drag. However, in the approach and landing, in which manoeuvre alone the highest lift-coefficient values are required, increase of parasite drag is not only innocuous but even beneficial. Further, in this manoeuvre a nose-down attitude of the aircraft to the flight-path tends to improve the pilot's view.

The setting of the aerofoil at a negative angle of attack will bring about changes of aerodynamic centre and moment coefficient which will alter the stability and control characteristics in the pitching plane, the conditions in this respect being similar to those with a conventional wing. The advantage of ultra-high lift obtainable in this way must therefore be balanced against the sacrifice of the advantages of fixed aero-dynamic centre and a constant moment coefficient associated with a fixed angle of attack setting of the aerofoil as previously mentioned.

Yet a further object of the invention is a novel means for providing a possible solution to the problem of gust-alleviation, a problem which becomes acute in large aircraft.

This object is achieved by giving the aerofoil of my improved aerofoil-flap combination a well rounded form, i. e. without sharp leading and trailing extremities, the areas over which distributed suction is applied to the boundary layer being extended towards the leading edge on both surfaces sufficiently to ensure that separation of the boundary layer is suppressed, and arranging that the flap can be wholly withdrawn into the interior of the aerofoil.

The manner in which such an arrangement can serve for gust-alleviation can best be understood by considering an aerofoil of circular section provided with distributed suction applied to the whole of its surface to prevent separation of the boundary layer and with a certain value of circulation established about it in a uniform airstream. Then a change of angle of attack will not be accompanied by a change of circulation. The problem is therefore one of setting up the circulation and this is accomplished by the flap, the amount of circulation depending on the flap setting. But once the circulation is set up, withdrawal of the flap without moving it normal to itself, i. e. by an edgewise movement, will not destroy or alter the circulation, which will persist at the value set up by the flap in spite of the latter's having been withdrawn, since the circulation can only be changed by shedding of vortices and there is no condition present which would cause vortices to be generated.

The above reasoning also applies if the aerofoil is not actually circular in section but of a well-rounded form, since there will likewise be no change of circulation when the angle of attack alters, owing to the absence of a sharp leading or trailing edge.

By a "well-rounded" aerofoil section is meant one whose minimum radius of curvature is not less than one fifth and preferably at least one half of the square of the thickness/ratio. Those parts of the aerofoil surface to which distributed suction is to be applied may be made of porous or finely perforated material, on the inner side of which are provided cavities to which suction is applied; and the total quantity of air to be sucked through a given surface area will be minimised if a "hydrodynamically" porous surface is used, i. e. one in which the linear pore size and spacing are both small relatively to the thickness of the boundary layer of air flowing over the surface, i. e. not greater than about one fiftieth of the calculated thickness of a laminar boundary-layer for the normal operating conditions.

Applications of the invention to aeroplane wings or lifting elements are illustrated in the accompanying drawings showing, by way of example only and not of limitation of the scope of the invention, which is defined in the appended claims, three embodiments of the invention. In the following description having reference to the drawings, the objects, advantages and features of the invention will be further described.

In the drawings:

Figure 1 is a perspective view from behind, above and from the right of an aeroplane embodying the invention;

Figure 2 is a vertical chordwise section of the trailing part of the wing of the aeroplane of Figure 1;

Figure 3 is a partial section on the line 3—3 of Figure 2;

Figure 6 is a sectional plan view of the wing of the aeroplane of Figure 5;

Figure 16:
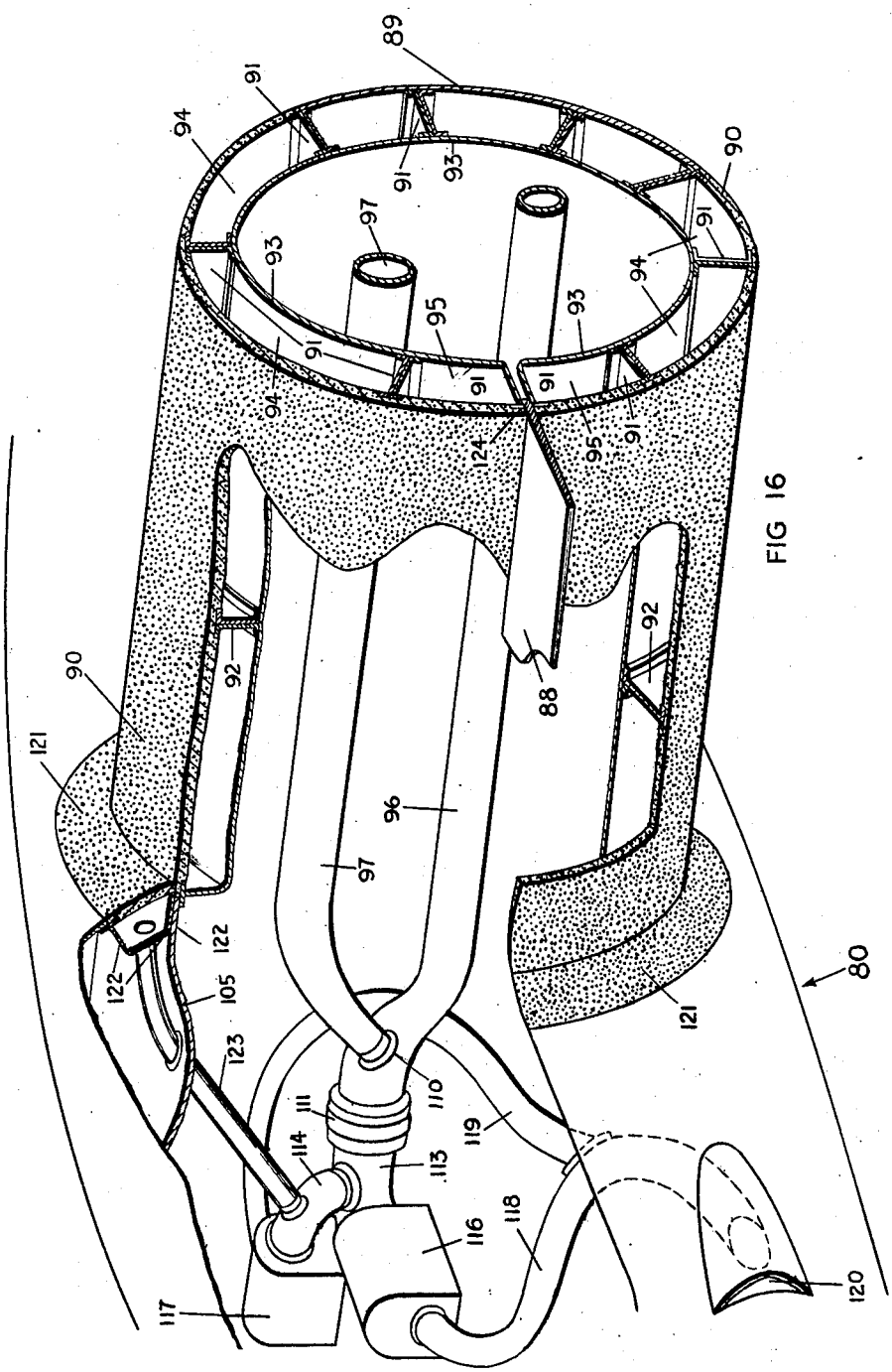

Figures 7 and 8 are vertical chordwise sections of the trailing part of the wing of the aeroplane of Figure 6, on the lines 7—7 and 8—8 respectively of Figure 6;

Figures 9 and 10 are enlarged views of the parts indicated by arrows 9 and 10 respectively in Figure 6;

Figures 11 and 12 are perspective views, taken respectively from behind, above and to the right, and from in front and to the right, of an aeroplane embodying a third form of the invention;

Figure 13 is a partial rear-elevational section of the left-hand fuselage-wing junction of the aeroplane of Figures 10 and 11;

Figure 14 is a section on the line 13—13 of Figure 13;

Figure 15 is a section on the line 14—14 of Figure 13;

Figure 16 is a partly broken-away perspective view of the left-hand fuselage-wing junction of the aeroplane of Figures 11 and 12, omitting some parts and showing the disposition of suction pumps and the run of suction ducting; and Figure 17 is a partly broken-away plan view of the wing of the aeroplane of Figures 11 and 12.

Figure 1 shows a monoplane, of conventional type except for the wings, comprising a fuselage 20, and conventional tail- and control-surfaces 21. It is powered by four turbo-jets whose jet pipes are indicated at 22.

Figure 4:
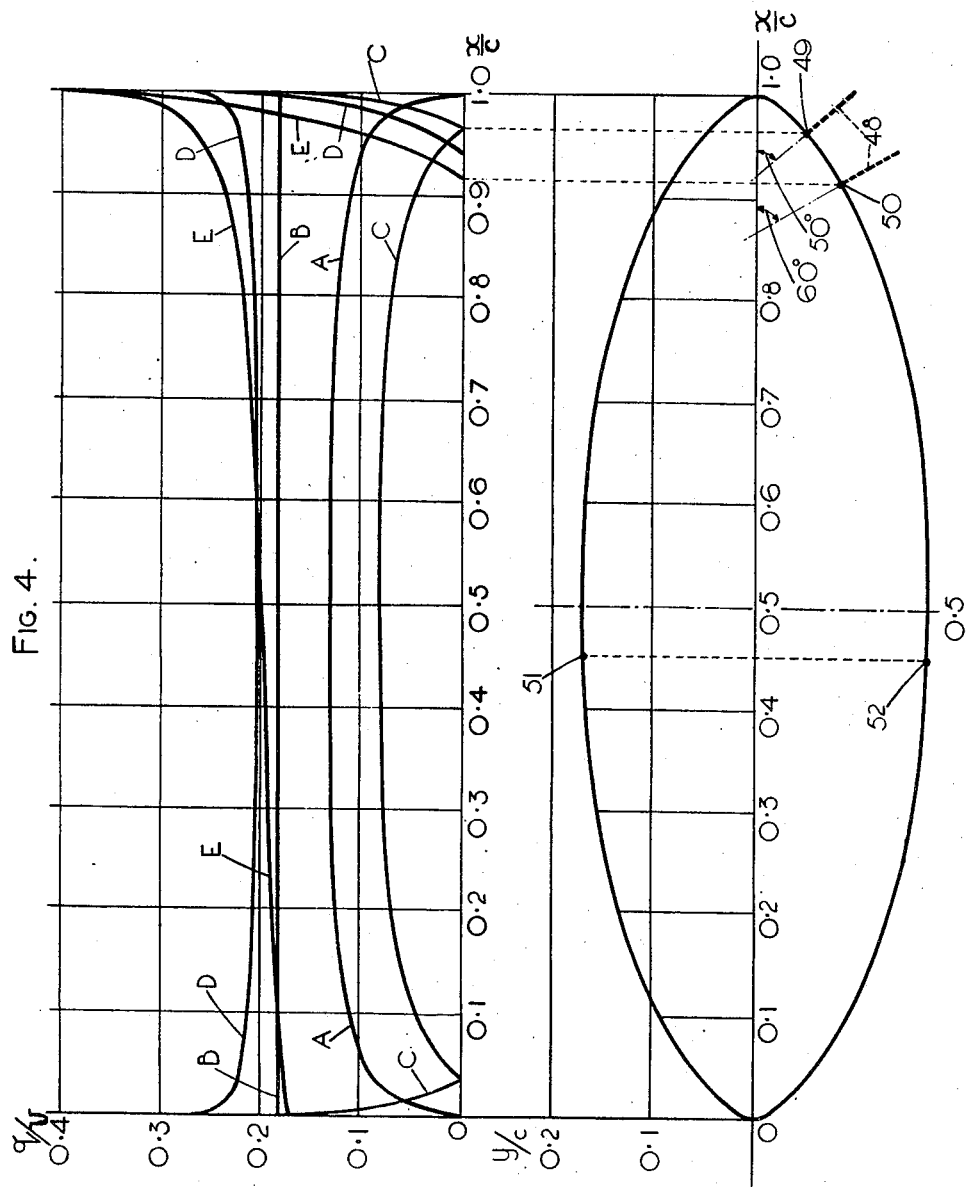
Figure 4 is a diagram showing an outline of the aerofoil section of the wing and velocity distributions over it in some specified conditions of operations.

The monoplane wings 18 (right and left) are of the section shown in Figure 4, the forward part of the wing being of conventional construction with smooth skin 19 of impervious sheet material, and the trailing part, as shown in Figures 2 and 3, comprising a braced internal supporting structure 23, a skin 24 of porous material, and continuous, internal, impervious, rigid walls 25, 26 defining enclosed chambers 27 on the underside of the porous skin 24, connected by ducts 28 with a span-wise duct 29 which enters the fuselage and to which suction is applied by a pump 30 driven by a motor 31 and exhausting through a pipe 32 discharging rearwardly through an opening 33 in the side of the fuselage.

At intervals along the span, are provided box-structures 34 housing guide tracks 35, running chordwise and parallel to the wing surface and supporting endless chains 36 stretched over idle sprockets 37 and driven sprockets 38, which are supported in bearings (not shown) in the box-structures 34, the sprockets 38 being driven through gearing 39, 40 by electric motors 41 mounted on the structures 34.

Each set of guide-tracks 35 also supports a carriage 42 provided with rollers 43 running in lateral extensions 44 of the guide-tracks and with brackets 45 attached to the outer strands of the chains 36. Each carriage has an arm 46 extending rearwardly at right angles to the guide-flange 44 and therefore at right angles to the outer surface of the wing. Arms 46 are accommodated in chordwise slots 47 in the trailing part of the wing located between end walls 26 of adjacent suction-chambers 27 and support a thin, full-span trailing flap 48 which is only interrupted to accommodate the jet-pipes 22.

Since the carriage 45 moves parallel to the outer surface of the wing, the flap not only always extends at right angles to the wing surface, but its inboard end follows the wing-surface contour, as the flap is lowered or raised by means of the motors 41, which are synchronously operated, by any suitable control means, as known to those skilled in the art, the necessary working clearance between the wing and flap being kept to a minimum.

The main suction duct 29 is of as large a cross-section as can conveniently be accommodated, to avoid loss of suction head along the span towards the wing-tips and the branch-ducts 28 are arranged at frequent spanwise intervals, as schematically shown in Figure 1, to equalise suction head along the span in the chambers 27.

For the porous part of the wing surface a sintered aluminium having pores whose linear size and spacing are both not more than 1/100 in. is preferably used.

The wing is preferably without wash-in or wash-out, and the chord line is preferably set approximately at zero-incidence to the longitudinal centre-line of the fuselage. There is no reason why the flap itself should not be given a slight wash-in or wash-out, but it is not considered that it will usually be necessary or advantageous.

The sides of the fuselage in the neighbourhood of the junction with the porous part of the wing surface are also provided with a porous skin, as shown at 54 in Figure 1, to which suction is applied by means of the pump 30 through suction ducts and chambers (not shown) constructed in the same way as those in the wing itself.

Figure 4 illustrates a suitable wing-section for this aeroplane. It is of doubly-symmetrical form. The abscissae $x/c$ and the ordinates $y/c$, given in the table below, are measured in terms of the chord of the section, the origin O being at the leading edge and the $x$ axis along the chord line. The ordinates of one surface only are given, since the other surface is identically similar. The thickness ratio of the aerofoil section is 0.3432 and is constant throughout the wing which is equally tapered in chord and thickness. The forward limits of the porous skin on both surfaces of the aerofoil, indicated at 51, 52 in Figure 4, are at 0.45 chord from the leading edge, the flap-chord is 0.05 chord and the minimum radius of curvature of the contour at the trailing end is approximately 0.03 chord.

*Table*

| Abscissa $\frac{x}{c}$ | Ordinate (both surfaces) $\frac{y}{c}$ |
|---|---|
| 0.00000 | 0.00000 |
| 0.00673<br>0.99327 | 0.01794 |
| 0.01399<br>0.98621 | 0.02819 |
| 0.02360<br>0.97640 | 0.03885 |
| 0.03543<br>0.96457 | 0.04975 |
| 0.07423<br>0.92577 | 0.07707 |
| 0.12511<br>0.87489 | 0.10305 |
| 0.18657<br>0.81343 | 0.12621 |
| 0.25686<br>0.74314 | 0.14542 |
| 0.33400<br>0.66600 | 0.15978 |
| 0.41581<br>0.58419 | 0.16865 |
| 0.50000 | 0.17160 |

Figure 4 also shows graphically the chordwise distribution of the velocity $q$ at the outside of the boundary-layer in terms of the free-stream velocity U at infinity, for selected conditions. Curve A represents the velocity distribution on either surface at zero angle of attack of the aerofoil with the flap set along the chord-line. In this condition there is no circulation and the lift coefficient $c_L$ is zero.

The curves B, C represent the velocity distributions on the upper and lower surfaces respectively when the flow represented by curve A is modified by imposing a circulation corresponding to a $c_L$ of 2.8. This implies that the angle of attack of the aerofoil remains zero, the circulation being created by setting the flap downwards to the position at which its root coincides with the trailing stagnation point 49, at which the normal to the aerofoil contour makes an angle of approximately 50° with the chord. The flap-setting is therefore substantially 50° downwards. This represents the normal maximum flap-setting.

It will be seen the the downstream velocity gradients of curves A, B, and C are nowhere negative on the leading half of the aerofoil. Consequently, the boundary layer has no tendency to separate over the non-porous part of the wing-surface and can be kept laminar if the surface is smooth enough and free from waviness. Distributed suction over the rear half of the aerofoil prevents separation in spite of negative velocity gradient, and if strong enough preserves laminar flow.

Further increase of the circulation (at zero aerofoil angle of attack) will give rise to negative velocity gradients on the forward half of the aerofoil liable to cause the boundary layer to separate and stall the wing, so that the theoretical velocity distribution and $c_L$ may not be achievable in practice.

This is illustrated by curve D, representing the velocity distribution on the upper surface and on the lower surface from the trailing extremity to the trailing stagnation point with circulation corresponding to $c_L=4.0$, the aerofoil angle of attack being still zero. It will be seen that the gradient of curve D is negative near the leading edge.

A higher $c_L$ than that corresponding to the velocity distribution B, C can however be obtained without giving rise to negative gradients over the non-porous part of the aerofoil's surface by setting the aerofoil at a negative angle of attack while imposing a stronger circulation than that associated with the velocity distribution B, C. This is illustrated by curve E, representing the velocity distribution on the upper surface and on the lower surface from the trailing extremity to the trailing stagnation point 50 at an aerofoil angle of attack of —10°, with circulation corresponding to $c_L=4.0$. To achieve this circulation the flap-root must be moved to point 50 and the flap angle is approximately 60° down. Provision for such an "abnormal" setting may be made.

Since the dividing stream line originating at the trailing stagnation point of an aerofoil section having a finite radius of curvature intersects the contour orthogonally but curves as it extends downstream, the flap must not only be normal to the contour but of narrow chord, since its chord must coincide with this stream-line. It also follows that the root of the flap must have negligible extension along the contour. Numerical limits for flap-thickness and flap-chord cannot be stated precisely, but it is considered that in practice the flap-chord should not greatly exceed the minimum radius of curvature of the trailing part of the section and the flap-thickness throughout should be as small as possible consistent with strength and stiffness and that in any case the above mentioned minimum radius of curvature should be large relatively to the flap-thickness, i. e. at least five times as great.

The moment coefficient of this aerofoil is zero at zero angle of attack (curves A to D) for all flap-settings; and at any finite angle of attack, e. g. —10° (curve E), is constant for all flap-settings.

Figure 5:
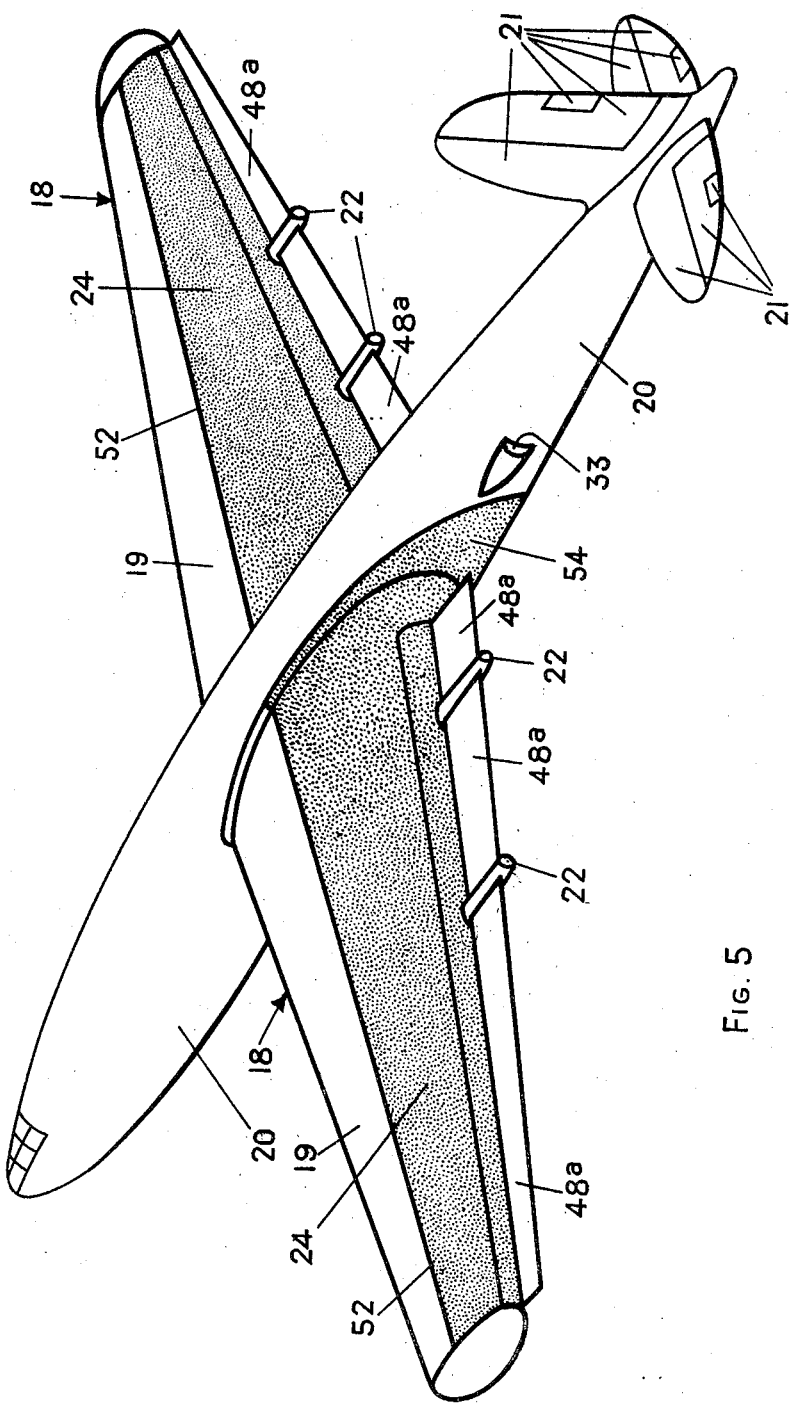
Figure 5 is a view similar to Figure 1 of an aeroplane embodying an alternative form of the invention, taken from behind, above and from the left.

The aeroplane shown in Figure 5 is in many respects similar to that of Figure 1, corresponding parts being designated by the same reference numerals. It differs in the construction and mechanism of the extreme trailing portion of the wing and of the flap and of the suction arrangements associated with them, the flap in this instance being retractable as well as angularly displaceable.

The structure of the trailing portion of the wing 18 is illustrated in Figures 6 to 10. The extreme trailing portion of the wing of which the chordwise section is a circular arc is constituted by a partially rotatable drum 55, interrupted where necessary to accommodate the jet-pipes 22, in the form of conical frustrum tapering towards the wing-tip to conform to the decreasing radius in this direction of the circular arc in which the trailing part of the aerofoil section terminates having regard to the general taper of the wing. Each section of the drum 55 is mounted for rotation about its axis and comprises ring-frames 56 supporting a continuous rigid skin by which its interior is completely enclosed to form a suction chamber. The skin comprises end plates (not shown) an impervious circumferential part 57, which is always shrouded by the fixed part of the wing, and a circumferential part 58 made of porous material and similar to the porous skin 24 of the fixed wing-part.

The part of the surface of the drum 55 which lies within the wing contour is shrouded by a continuous, rigid, curved diaphragm 59 forming the rear structural member of the fixed wing-part and fitting closely to the surface of the drum 55, to which suction is applied through openings 60 in the impervious skin-part 56 registering in all positions of the drum 55 with elongated circumferential slots 61 in the diaphragm 59, the slots 61 constituting the mouths of flattened trumpet-shaped branch ducts 28ª extending from the main duct 29, which is also fed by other branch ducts 28 extending from the chambers 27 formed by the walls 25, 26 under the porous skin 24 of the fixed wing-part as in the first-described embodiment.

The drum 55 is rotatably supported by means of bearing brackets 62 extending rearwardly from the diaphragm 59 at intervals along the span and having coaxial bearings supporting short shafts 63, the ends of each of which are supported in paired plate-webs 64 secured to adjacent ring-frames 56 and interconnected by a bent plate 65, the webs 64 and plate 65 extending continuously to the skin 57 of the drum 55, which is cut away between the webs 64, so that the latter and the plate 65 constitute a box-bracket supporting the shaft 63 and define a flat-sided, sector-shaped recess extending inwardly from the surface of the drum 55 and enclosing a bearing bracket 62, which recess is not in communication with the interior of the drum 55 and therefore not subjected to suction.

On the shaft 63 is secured a toothed-sector 66 meshing with a pinion 67 driven through coaxial reduction gearing (not shown) by an electric motor 68 mounted on the bearing bracket 62. The several motors 68 are synchronously controlled by means known to those skilled in the art to rotate the drum 55 through a total angular displacement corresponding to the selected angular range of flap-settings, the limiting upper setting being at 0° to the chord line.

At spanwise intervals, the drum 55 is provided with box frames 69 extending radially inwards from the skin 58 and secured to the ring-frames 56. The frames 69 carry guides 70 on which carriages 71 are radially slidable, for which purpose they are provided with rollers 72. On each carriage 71 is mounted an electric motor 73 which drives through reduction gearing (not shown), a pinion 74 engaging a rack 75 mounted on the frame 69 above and parallel to the guides 70. To the carriages 71 is rigidly secured the inboard end of a thin full-span trailing flap 48ª interrupted only where necessary to accommodate the jet-pipes 22. The flap extends through a slot 76 in the skin 58, the edges of the slot being provided with sealing strips 77 of springy material; and the ring-frames 56 are interrupted to accommodate the inboard end of the flap. By synchronous operation of the motors 73, the flap can be retracted through the slot 76 until its trailing edge is flush with the surface of the drum 55 (as shown in Figure 8).

To avoid the inboard edge of the flap fouling the box brackets 64, 65 when retracted, the flap-chord must be somewhat less than the radius of the drum 55, with an allowance for the projection beyond the drum axis towards the flap of the bearing brackets 62 and box-brackets 64, 65 which enclose them as will be seen in Figure 6. Since the wing is tapered, the flap-chord is also tapered and the distance through which the flap must retract at the wing-tip is less than at the wing-root. Consequently, the gear-ratio or tooth-size of the several pinions 74, and racks 75 must vary uniformly along the span to ensure that all parts of the flap are proportionately retracted when the motors 73 are synchronously operated.

The trailing ends of the fixed porous skin 24 are shaped to fine wedge-ends to mate with the surface of the drum 55 tangentially and are provided with sealing strips 78 of springy material to seal the necessary working clearance between the fixed skin 24 and the skin 58 of the drum.

The control leads of the motors 73 are not shown but are flexible at least in part, and may be led through the trumpet-ducts 28ᵃ and main duct 29, and brought out through sealed bushes in the wall of the last-named duct.

The drum 55 may be provided with internal transverse baffles (not shown) for the purpose of equalising suction head along its length.

For this embodiment, a suitable aerofoil section is that illustrated in Figure 4 modified by replacing the trailing end with a circular arc centred on the chord line and tangential to the unmodified profile.

The radius of the arc will depend on the angular flap-movement to be provided. If the limiting downward flap-setting is 45° the arc will subtend 90° and the radius will be about 0.053 of the chord. If greater flap-movement is required, the angle subtended by the trailing arc will be greater than 90°, and consequently its radius will be somewhat greater than 0.053 chord. This modification of the aerofoil section will make little difference to its aerodynamic properties including the velocity distributions represented by the curves A to E of Figure 4. The flap-chord is limited by structural considerations, as stated above, and if the trailing arc of the section has a radius of about 0.053 chord the maximum flap-chord that can be accommodated will be about 0.04, or at most 0.045 of the chord.

Since at any flap-setting the root of the flap defines the trailing stagnation point and the flap-chord lies along the dividing stream line originating thereat, it follows that retraction of the flap will not alter the circulation, which has been set-up by setting-down the flap in the manner previously described. With the flap retracted this circulation will persist and its strength will not be altered by a change of angle of attack, due e. g. to a gust. This novel effect depends on the fact that the un-flapped aerofoil section has no sharp trailing edge which would determine the stagnation point, the use of a blunt, rounded trailing extremity being rendered possible by the application of distributed suction through a porous surface to suppress separation of the boundary layer.

The aeroplane illustrated in Figures 11 and 12 has twin fuselages 79, 80 each carrying a fin 81 and rudder 82; a common tail plane 83 with elevators 84 is placed between the fuselages, which house turbo-jet motors (not shown) whose inlets are shown at 85 and jet nozzles at 86. Between the fuselages is mounted a single "wing" 87 in the form of a circular cylinder carrying a trailing flap 88.

The wing 87 comprises a continuous circumferential rigid skin 89, 90 supported on longitudinal radial webs 91, ring webs 92 and an inner circumferential skin 93, the whole forming a rigid structure.

The forward facing part 89 of the skin, subtending an angle of 90° at the axis of the wing is of impervious sheet material, the remainder 90 being of porous sheet material, similar to that used in the previously described embodiments. Beneath the skin 90 are suction chambers 94, 95 defined by the webs 91, 92 and inner skin 93, to which suction is applied through main spanwise ducts 96, 97 and branch ducts 98, 99 disposed at frequent intervals along the span. It will be seen that the more forward suction chambers 94 are connected by ducts 98 with duct 96 and that the trailing suction chambers 94 are connected by ducts 99 with duct 97. Thus two independent suction systems are provided, having independent suction sources as hereinafter described, whereby a different suction head is applied to the trailing part of skin 90 than to the more forward part thereof.

The ends of the cylindrical ring are received in the right and left hand fuselages through close-fitting apertures, in which the working clearance is kept to a minimum, and terminate in diaphragm frames 100 having central hollow bosses 101, each supported in large diameter ball-bearings 102 by a bearing-housing 103 supported by or integral with a stationary diaphragm-frame 104 forming part of the internal structure, schematically indicated at 105, of the fuselage.

Each boss 101 carries a spur ring-gear 106 meshing with a pinion 107 driven through reduction gearing (not shown) by an electric motor 108 mounted on a bracket 109 secured to the fuselage structure 105.

At the wing-ends the main ducts 96, 97 are bent to bring them onto the wing axis, and the duct 97 passes through a sealed opening 110 in the wall of duct 96 to become coaxially nested within it. The coaxial ends of ducts 96, 97 pass through the boss 101 and ring-gear 106 into the fuselage where they are respectively connected by means of rotary joints 111, 112 incorporating sealing glands with stationary duct extensions 113, 114. The inner duct-extension 114 is brought out through a sealed opening 115 in the wall of duct-extension 113.

The duct-extensions 113, 114 are respectively connected to pumps schematically illustrated at 116, 117 driven by independent motors (not shown) and exhausting through pipes 118, 119 discharging rearwardly through openings 120 in the side of the fuselage; and the pumps 116, 117 create different suction-heads.

The sides of the fuselage in the neighbourhood of the porous-skinned parts of the wing-roots are provided with a porous skin 121, of similar construction to the porous skin of the wing; and beneath the porous-skinned areas 121 are provided suction chambers enclosed by walls 122 and connected by branch suction-ducts 123 with the main duct-extensions 114. The trailing flap 88 is completely retractable through a slot 124 in the skin 90 and between adjacent webs 91, the inner skin 93 being interrupted to accommodate the flap, and the slot 124 being provided with sealing strips (not shown).

As in the second-described embodiment the flap is supported at its inboard end on carriages 71 having rollers 72, running on radial guides 70 supported in frames 69, and is retractable by means of motors 73, pinions 74, and racks 75, sets of the items 69 to 75 being disposed at intervals along the span, and constructed and arranged in the same way as the items having the same reference numerals in Figures 6 to 10.

Synchronous operation of the motors 108 in each fuselage rotates the wing and with it the flap, whose limits of angular displacement with respect to the longitudinal centre lines of the fuselages are 0° and 60° downwards.

Synchronous operation of the motors 73 retracts the flap. In the fully retracted position the trailing edge of the flap is flush with the surface of the cylindrical wing.

The porous skin 90 of the wing is unsymmetrically disposed about the flap-slot 124, extending 165° from the slot above it and 105° from the slot below it.

The chord of the flap, when fully extended, is 0.05 of the external radius of the cylindrical wing.

If desired the porous skin 90 may be extended over the whole surface of the wing, the suction chambers 94 being continued round the leading part of the wing and the impervious skin-part 89 being omitted, all as suggested in Figure 12A of the drawings in which the same reference characters are used as in the embodiment illustrated in Figure 12.

The controls of the flap-operating motors of the several embodiments are not illustrated, as they do not in themselves form part of the invention; and their design, construction and layout are within the competence of those skilled in the art and present no novel problems. It should however be stated that the means controlling the angular displacement of the flap must be capable of locating the flap at any angular setting within its range of movement and should include either a lever or like manual control which selectively controls the flap-setting and which can be placed in any selected position within its range, or a reversing switch or the like combined with an indicator of flap-setting enabling the pilot, or other crew-member, to initiate movement of the flap by the motors in either direction and to arrest the motion when the flap has attained the selected setting. The means controlling retraction of the flap in the second and third embodiments (Figures 5 to 17), however, are preferably provided with a two-position manual control member giving either full extension or full retraction of flap, since partial retraction of the flap is neither necessary nor useful.

It should further be emphasized that the aerofoil section of Figure 4 is merely an example of a suitable section; a wide variety of sections having appropriate characteristics and with any thickness-ratio, but preferably between 30% and 100%, can be designed by known mathematical methods.

As used herein, the term "leading portion" of an aerofoil obviously means the portion of the aerofoil which first meets the air stream, and the expression "trailing portion" signifies the opposite portion of the aerofoil which is the last to be enveloped by the air stream. The term "spanwise" is familiar to all skilled in the art and signifies the direction across the aerofoil at substantially right angles to the chord thereof and to the direction of relative flow of the air stream.

I claim:

1. An aerodynamic device for producing variable lift, said device comprising an aerofoil having a leading portion and a trailing portion, the chordwise section of said trailing portion of the aerofoil being of rounded form, a porous skin on at least the trailing portion of the aerofoil, and means at least partially contained within said device and applied to the under-side of said porous skin for applying suction to the air flowing over said porous skin through the pores thereof; in combination with a spanwise thin plate-like trailing flap, means adjustably and revolubly mounting said flap on the aerofoil adjacent said trailing portion for movement peripherally of the trailing surface of the aerofoil in a direction substantially normal to the span of the aerofoil, guiding means included in said mounting means, said guiding means confining the movement of the flap to follow the contour of the surface of the trailing portion of the aerofoil, and means included in said guiding means for maintaining said flap, at all points of its operative movement, substantially normal to said surface.

2. A construction as claimed in claim 1 in which a spanwise slot is provided in the rounded trailing portion of the aerofoil for the reception of the flap when the latter is in inoperative retracted position within the aerofoil, means carried by the aerofoil and operatively connected with said flap for slidably moving said flap through said slot into operative extended position and to inoperative retracted position.

3. In an aerodynamic structure, in combination, an aerofoil having a leading portion and a trailing portion, and a thin plate-like trailing flap, means carried by said aerofoil revolubly mounting said flap on the aerofoil and operatively connected to said flap for adjusting it along at least said trailing portion to a plurality of selected angular positions relatively to the chord of the aerofoil, guiding means carried by said aerofoil maintaining said flap always at right angles to the surface of the aerofoil to which it is adjacent irrespective of the angularly adjusted position of the flap, the trailing portion of said aerofoil having chordwise sections whose minimum radius of curvature is large relative to the thickness of the flap, a porous skin comprising at least that part of the surface of the aerofoil along which said flap is moved together with parts immediately adjacent thereto, and means disposed at least partly within said structure for applying suction through said skin to the air flowing over such porous parts of the surface.

4. An aeroplane including a lifting wing embodying the combination claimed in claim 3, means in the aeroplane for producing suction and means connecting said last named means with the inner face of the porous skin for applying the suction so produced to said inner face.

5. A construction as claimed in claim 3, in which the chordwise sections of the part of the aerofoil surface along which the flap is moved conform to circular arcs, the trailing extremity of the aerofoil being constituted by a movable element of circular chordwise section which is rotatable about an axis containing the centres of the circular arcs, and includes means constraining the flap to rotate with said element about the same axis.

6. A construction as claimed in claim 5, in which a spanwise slot is provided in the rotatable element, means are provided mounting the flap in the slot, and means are connected to said flap for slidably retracting the flap through the slot into the interior of the aerofoil.

7. An aeroplane including a lifting wing embodying the combination claimed in claim 6, means in the aeroplane for producing suction and means at least partially contained within said wing and applied to the inner face of the porous skin for applying the suction so produced to said inner face.

8. An aeroplane including an aerodynamic structure as set forth in claim 3, in which the chordwise sections of the part of the aerofoil surface along which the flap is moved conform to circular arcs, the trailing extremity of the aerofoil being constituted by a movable element of circular chordwise section which is rotatable about an axis containing the centres of the circular arcs, and includes means constraining the flap to rotate with said element about the same axis, and in which means are provided in the aeroplane for producing suction and means at least partially contained within said wing and applied to the inner face of the porous skin for applying the suction so produced to said inner face.

9. An aerodynamic device for producing variable lift, said device comprising an aerofoil having a leading half and a trailing half, said aerofoil being in the form of a solid of revolution, a thin plate-like trailing flap associated with said aerofoil, means revolubly mounting said flap on the aerofoil for movement through a limited angle about the axis of said aerofoil, means carried by the aerofoil and operatively connected with said flap for moving said flap relatively to the air flow at a distance from the aerofoil along the surface of the trailing half of the aerofoil, guiding means on said aerofoil maintaining said flap in all positions therealong substantially at right angles to the surface of the aerofoil, a porous skin on the aerofoil and occupying at least the whole of the trailing half of the circumference thereof, the limiting case in which the porous skin occupies the whole of the aerofoil being included, and means at least partially disposed within said device and applied to the inner side of said porous skin for applying suction through said skin to the boundary layer in contact therewith.

10. A construction as claimed in claim 9 in which said suction applying means comprises internal walls forming a first suction chamber, which underlies the extreme trailing part of the porous skin adjacent the flap and extending above and below it, and other suction chambers which underlie the remainder of the porous skin, two independent sources of suction, means connecting said sources respectively to the first suction chamber and to said other suction chambers, whereby a greater suction head can be applied to the extreme trailing part of the porous skin than to the remainder thereof.

11. An aerodynamic device for producing variable lift, said device comprising, in combination, an aerofoil in the form of a solid of revolution having a leading half and a trailing half, means for supporting said aerofoil, a thin plate-like flap associated with the aerofoil, means supporting said flap from said aerofoil and guiding means carried by said aerofoil and maintaining said flap at right angles to the surface thereof at all times, means mounting the aerofoil and flap on said first named supporting means for rotation as a unit about the axis of revolution of the aerofoil through a limited angle relatively to said first named supporting means, a porous skin on said aerofoil through which suction can be applied to the boundary layer in contact therewith, said skin occupying at least the whole of the trailing half of the circumference of the aerofoil, the limiting case in which the porous skin occupies the whole surface of the aerofoil being included.

12. A construction as claimed in claim 11, in which the aerofoil is provided with a spanwise slot receiving the inboard end of the flap and means carried by said aerofoil for wholly retracting said flap into the aerofoil through said slot.

13. An aeroplane including spaced twin fuselages and a variable-lift-producing device as claimed in claim 12 extending transversely from one fuselage to the other, the aerofoil thereof being cylindrical and the aerofoil-supporting means thereof being incorporated in the structure of the fuselages to support the aerofoil at each end.

14. A construction as claimed in claim 11, including means for applying suction to the inner face of the porous skin, said means comprising a suction trunk fixed to the aerofoil to extend substantially axially thereof, an axial extension thereof fixed to the aerofoil-supporting means, a rotary joint connecting the trunk and its extension, and a sealing gland incorporated in the joint.

15. A construction as claimed in claim 11, including means for applying suction to the inner face of the porous skin, said means comprising internal walls forming a first set of suction chambers which underlie the extreme trailing part of the porous skin adjacent the flap and extend above and below it, and other suction chambers which underlie the remainder of the porous skin, duct means fixed to the areofoil and connected to the first set of suction chambers and including a first trunk disposed longitudinally with respect to the axis of said aerofoil, other duct means fixed to the aerofoil and connected to the other suction chambers and including a second longitudinally extending trunk having an end portion coaxially nested with an end portion of the first named trunk, coaxially nested extensions of the first and second axial trunks fixed to the aerofoil supporting means, coaxial rotary joints connecting the first and second axial trunks with their respective extensions, sealing glands incorporated in the joints, and two independent sources of suction in fixed relationship with the aerofoil-supporting means and connected respectively to the first and the second trunk extensions, whereby different suction heads can be applied to the extreme trailing part of the porous skin and to the remainder thereof respectively.

16. An aeroplane including spaced twin fuselages and a variable-lift-producing device as claimed in claim 15 extending transversely from one fuselage to the other, the aerofoil thereof being cylindrical and the aerofoil-supporting means thereof being incorporated in the structure of the fuselages to support the aerofoil at each end, and the suction sources being housed within one at least of the fuselages.

17. An aeroplane as claimed in claim 16 in which the suction sources, trunks and coaxial trunk extensions are duplicated, each fuselage housing a similar pair of suction sources and each end of the lifting device having a similar set of trunks and trunk extensions.

18. An aeroplane including spaced twin fuselages and a variable-lift-producing device as claimed in claim 11 extending transversely from one fuselage to the other, the aerofoil thereof being cylindrical and the aerofoil-supporting means thereof being incorporated in the structure of the fuselages to support the aerofoil at each end.

BRYAN THWAITES.

References Cited in the file of this patent

UNITED STATES PATENTS

| Number | Name | Date |
|---|---|---|
| 1,278,750 | Romualdi | Sept. 10, 1918 |
| 1,752,554 | Gerbracht | April 1, 1930 |
| 1,917,428 | Burnelli | July 11, 1933 |
| 1,927,538 | Zaparka | Sept. 19, 1933 |
| 2,041,792 | Stalker | May 26, 1936 |
| 2,340,396 | McDonnell | Feb. 1, 1944 |
| 2,406,916 | Stalker | Sept. 3, 1946 |
| 2,406,917 | Stalker | Sept. 3, 1946 |
| 2,406,924 | Stalker | Sept. 3, 1946 |
| 2,407,185 | Stalker | Sept. 3, 1946 |
| 2,447,100 | Stalker | Aug. 17, 1948 |
| 2,468,883 | La Pointe | May 3, 1949 |

FOREIGN PATENTS

| Number | Country | Date |
|---|---|---|
| 222,845 | Great Britain | May 3, 1925 |
| 479,598 | Great Britain | Feb. 7, 1938 |
| 512,064 | Great Britain | Aug. 29, 1939 |
| 589,420 | Germany | Dec. 7, 1933 |
| 866,952 | France | June 23, 1941 |

OTHER REFERENCES

Journal of the Aeronautical Sciences, Feb. 1947 (pp. 106 and 107).

N. A. C. A. Tech. Note, 1741 Wash., November 1948.